United States Patent [19]

Wallmuller

[11] 3,731,810
[45] May 8, 1973

[54] ION-EXCHANGER

[75] Inventor: Hugo Wallmuller, Essen-Ruttenscheid, Germany

[73] Assignee: GHH-M.A.N. Technik Gesellschaft Fur Anlagenbau MbH, Essen, Germany

[22] Filed: May 6, 1971

[21] Appl. No.: 140,907

[30] Foreign Application Priority Data

May 15, 1970 Germany.....................P 20 25 035.5

[52] U.S. Cl. ...............................................210/189
[51] Int. Cl. .............................................B01d 33/16
[58] Field of Search.........................210/33, 189, 268

[56] References Cited

UNITED STATES PATENTS 3,554,376   1/1970   Kunz ...................................210/189
2,963,431   12/1960  Dorn et al. ............................210/33

Primary Examiner—Samih N. Zaharna
Attorney—Holman & Stern

[57] ABSTRACT

An ion-exchanger comprising an exchanger column, a regenerating column connected in series with said exchanger column, and a washing column connected downstream of the said regenerating column, the regenerating column and the washing column being arranged concentrically within the exchanger column and forming the inner wall of the exchanger column, feedlines connecting the said exchanger column to the said regenerating column and the said washing column to the said exchanger column, untreated water inlet and clean water outlet lines communicating with said exchanger column, regenerating medium inlet and outlet lines communicating with said regenerating column, and a washing water inlet line communicating with said washing column.

2 Claims, 1 Drawing Figure

Patented May 8, 1973                                3,731,810
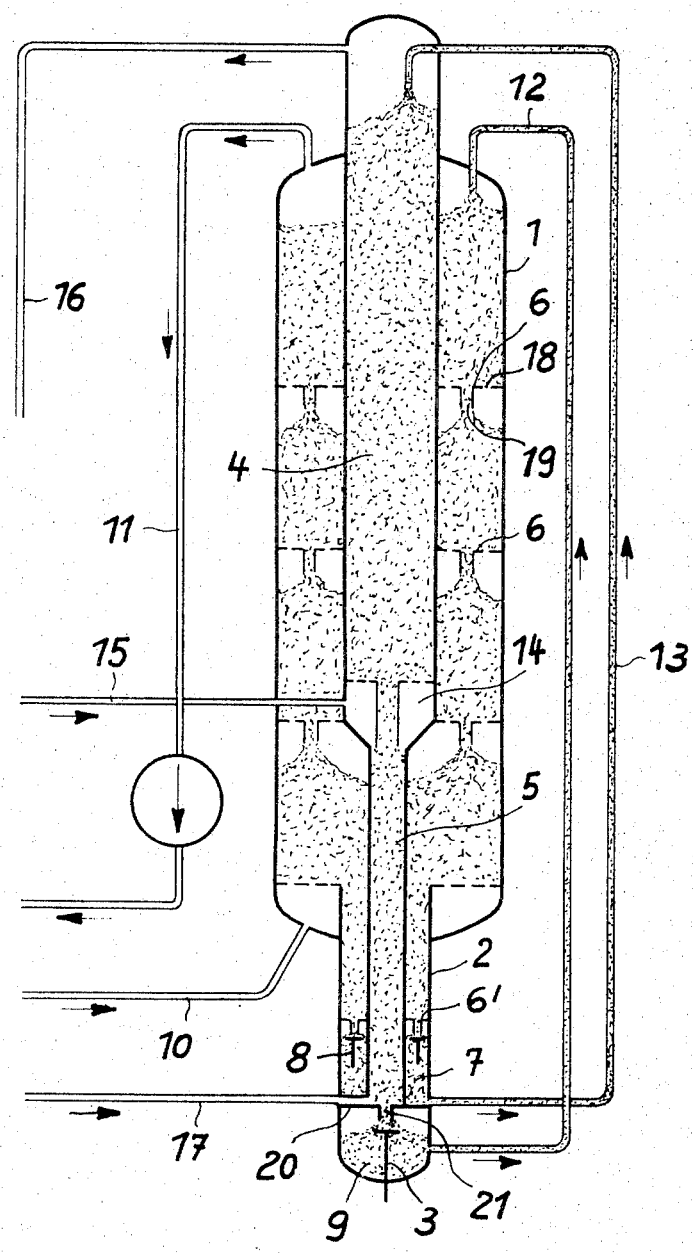
INVENTOR
HUGO WALLMÜLLER
BY

ION-EXCHANGER

This invention relates to an ion-exchanger for exchanging ions in aqueous solutions, with subsequent regeneration and washing of the exchange medium.

This invention particularly relates to ion-exchangers of the type comprising an exchanger column, a regenerating column connected in series with the latter, and a washing column connected downstream of the regenerating column. In such an ion-exchanger, the columns are connected to one another via feed lines, and inlet and outlet lines are fitted at the ends of each column in such a way that the exchanging media flow through the column in opposite directions.

Known ion-exchangers of the abovementioned type, described for example in British Pat. No. 1202718, are found to suffer from the disadvantage that the individual processing columns are disposed separately from one another and, as a result of transport considerations, cannot be joined together by pipelines until they are set up in the factory. This entails considerable financial outlay in respect of assembly.

The aim of the present invention is to construct the columns of the ion-exchanger in such a way that a compact design with as few individual parts as possible is obtained.

The present invention consists in an ion-exchanger comprising an exchanger column, a regenerating column connected in series with said exchanger column, and a washing column connected downstream of the said regenerating column, the regenerating column and the washing column being arranged concentrically within the exchanger column.

The compact construction of the ion-exchanger occupies an area substantially smaller than that occupied by known ion-exchangers, and considerable cost saving is achieved in the final installation at the factory, because of the possibility of pre-assembly at the manufacturing works.

In addition, the ion-exchanger is considerably easier to transport.

Preferably annular platforms are disposed between the inner wall of the exchanger column and the outer walls of the regenerating column and washing column, the annular platforms being provided with apertures to allow the passage of interchanging media. These platforms advantageously serve as supports between the columns and thereby increase the stability of the exchanger as a whole.

The invention will be further described, by way of example only, with reference to the accompanying drawing, which is a longitudinal section of an ion-exchanger.

In the drawing, an exchanger column 1 has at its lower end a narrowed portion 2. The exchanger column 1 contains, concentrically with its outer casing, a regenerating column 4, to the lower end of which is connected a washing column 5 which projects into the narrowed portion 2. Between the inner wall of the exchanger column 1 and the outer walls of the regenerating column 4 and washing column 5, there are disposed annular platforms 6, which brace the columns 1 and 4, 5 against each other. At the lower end, in the narrowed portion 2, the exchanger column 1 terminates in a bottom plate 20, and at the upper end of the exchanger column closes around the outer wall of the regenerating column 4, which projects upwards out of the exchanger column 1.

The platforms 6 are provided with sieve-like apertures 18, through which only untreated water to be cleaned, and not exchanger substance which passes through in a countercurrent, can pass. Passages 19 are provided to allow the passage of the exchanger substance. Arranged directly beneath the passages 19 in the lowest platform 6', are disposed valve plates 8 which may be vertically displaced to partially or completely close the passages so that the cross-sectional area of passage can be regulated. Exchanger substance passing through these holes 19 reaches a counterpressure chamber 7, from which it is drawn off by means of a pump (not shown), and supplied via a flow line 13 to the head of the regenerating column 4. In the same way, there is located at the foot of the washing column 5, an aperture 21 against which a valve plate 3 can be pressed. By vertically displacing the plate 3 it is possible to regulate the through-flow of regenerated and washed exchanger substance passing out through the aperture 21. The exchanger substance passes through the aperture 21 into a counter-pressure chamber 9 located beneath the latter, and from there is passed by means of a pump (not shown) into the upper part of the exchanger column 1 via a tubular flow line 12.

The ion-exchanger operates as follows.

The exchanger column 1 is fed with untreated water via a flow line 10. Clean water is removed through a flow line 11. The exchanger substance is supplied through the flow line 12 and passes through the exchanger column 1, in the opposite direction to the direction of flow of the untreated water, until it reaches the counterpressure chamber 7, whence it passes via the flow line 13 to the head of the regenerating column 4. In the region of the throat 14 which connects the regenerating column 4 to the washing column 5, the regenerating medium is fed in through a flow line 15. Clean washing water flows into the washing column 5 through a flow line 17. The used regenerating medium is discharged together with the washing water through the flow line 16. All the flows of liquid move in the columns in the direction opposite to the flow of exchanger substance.

I claim:

1. An ion-exchanger comprising an exchanger column, a regenerating column connected in series with the said exchanger column, and a washing column connected downstream of the said regenerating column; wherein the regenerating column and the washing column are arranged concentrically within the exchanger column, the regenerating column and the washing column forming the inner wall of the exchanger column, and the exchanger column extending along substantially the whole length of the regenerating column and the washing column; feed lines connecting the said exchanger column to the said regenerating column and the said washing column to the said exchanger column; untreated water inlet and clean water outlet lines communicating with the said exchanger column; regenerating medium inlet and outlet lines communicating with the said regenerating column; and a washing water inlet line communicating with the said washing column.

2. An ion-exchanger as claimed in claim 1 wherein annular platforms are arranged between the inner wall of the exchanger column and the outer walls of the regenerating column and washing column, the annular platforms being provided with apertures to allow the passage of interchanging media.

* * * * *